United States Patent
Davidson et al.

(10) Patent No.: US 9,939,229 B2
(45) Date of Patent: Apr. 10, 2018

(54) GUN SCOPE WITH BATTERY COMPARTMENT

(71) Applicant: Revic, LLC, Burlington, WY (US)

(72) Inventors: Aaron S. Davidson, Cody, WY (US); Andreas G. Schaefer, Hohenahr (DE); Christopher R. Thomas, Cody, WY (US)

(73) Assignee: Revic, LLC, Burlington, WY (US)

( * ) Notice: Subject to any disclaimer, the term of this patent is extended or adjusted under 35 U.S.C. 154(b) by 0 days.

(21) Appl. No.: 15/458,406

(22) Filed: Mar. 14, 2017

(65) Prior Publication Data

US 2017/0241742 A1    Aug. 24, 2017

Related U.S. Application Data

(63) Continuation-in-part of application No. 29/555,069, filed on Feb. 18, 2016.

(60) Provisional application No. 62/307,911, filed on Mar. 14, 2016.

(51) Int. Cl.
*F41G 1/38* (2006.01)
*H01M 2/10* (2006.01)

(52) U.S. Cl.
CPC ............ *F41G 1/38* (2013.01); *H01M 2/1055* (2013.01); *H01M 2220/30* (2013.01)

(58) Field of Classification Search
USPC .................................. 42/117, 111, 119, 123
See application file for complete search history.

(56) References Cited

U.S. PATENT DOCUMENTS

| D195,199 S | 5/1963 | Lanz |
| 4,554,744 A | 11/1985 | Huckenbeck |
| 4,859,058 A | 8/1989 | Ekstrand |
| 5,375,072 A | 12/1994 | Cohen |

(Continued)

FOREIGN PATENT DOCUMENTS

| EM | 003341973-0001 | 8/2016 |
| JP | 2015129779 A | 7/2015 |
| WO | WO2017/160873 A1 | 9/2017 |

OTHER PUBLICATIONS

GEN3 SRT 39X40 Scope, no date available, [online], [site visited Dec. 1, 2016]. Retrieved from <Url:http://www.ncstar.com/product/product-detail.aspx?GroupNo=O&ModelNo=VSRTP3940GV3>.

(Continued)

*Primary Examiner* — Reginald Tillman, Jr.
(74) *Attorney, Agent, or Firm* — Dorsey & Whitney LLP

(57) ABSTRACT

A gun scope is provided having a battery compartment. The battery compartment may be configured to house one or more batteries to provide electronic power to one or more electronic components associated with the gun scope. The battery compartment is associated with a rotatable component, such as a magnifying ring, and configured to rotate with the rotatable component about an axis. In one embodiment, the battery component may be integrally formed with the rotatable component. In another embodiment, the battery component may be formed as a separate component and coupled with the rotatable component. The battery compartment extends radially outward from the rotatable component and provides a lever for rotation of the rotatable component about its axis of rotation.

21 Claims, 5 Drawing Sheets

(56) References Cited

U.S. PATENT DOCUMENTS

| | | |
|---|---|---|
| 5,388,005 A | 2/1995 | Wilson |
| D427,275 S | 6/2000 | Gilmore |
| D430,257 S | 8/2000 | Chang |
| 6,359,418 B1 | 3/2002 | Regan et al. |
| D457,857 S | 5/2002 | Ogasawara |
| D515,118 S | 2/2006 | Larsson et al. |
| D604,384 S | 11/2009 | Bengtsson |
| D619,190 S | 7/2010 | Larsson |
| D623,126 S | 9/2010 | Contreras |
| D701,166 S | 3/2014 | Fishman et al. |
| D704,297 S | 5/2014 | Cheng |
| 8,915,392 B2 * | 12/2014 | Crispin .................... F41G 1/38 220/254.3 |
| D720,688 S | 1/2015 | Popper et al. |
| D721,750 S | 1/2015 | Teetzel et al. |
| D741,446 S | 10/2015 | Cheng et al. |
| D757,886 S | 5/2016 | Cheng et al. |
| 2005/0241209 A1 | 11/2005 | Staley, III |
| 2011/0167708 A1* | 7/2011 | Cheng .................... F41G 1/345 42/114 |
| 2012/0055063 A1 | 3/2012 | Lindau et al. |
| 2012/0154907 A1* | 6/2012 | Schmitt .................... F41G 1/38 359/399 |
| 2012/0195023 A1* | 8/2012 | Tang .................... F41G 1/345 362/85 |
| 2013/0174490 A1 | 7/2013 | Crispin et al. |
| 2015/0263469 A1 | 9/2015 | Olsson |

OTHER PUBLICATIONS

International Search Report for PCT/US 2017/22354 dated Jun. 16, 2017.

* cited by examiner

GUN SCOPE WITH BATTERY COMPARTMENT

CROSS-REFERENCE TO RELATED APPLICATIONS

This application is a continuation-in-part of a U.S. Design patent application No. 29/555,069 entitled GUN SCOPE WITH BATTERY COMPARTMENT, filed Feb. 18, 2016, the contents of which are incorporated by reference herein in its entirety. This application also claims the benefit of U.S. Provisional Application No. 62/307,911 entitled GUN SCOPE WITH BATTERY COMPARTMENT, filed on Mar. 14, 2016, the disclosure of which is incorporated by reference herein in its entirety.

BACKGROUND

Gun scopes can serve a variety of functions. For example, many gun scopes can magnify a viewing area, much like a telescope. Many gun scopes also include reticles that may be manually adjusted to provide an accurate aiming position based on a number of different factors, including distance to a target, angle to the target, wind, humidity, and ballistics characteristics of the projectile, to name a few. Rotatable turrets and rings are often provided on gun scopes to make desired adjustments to reticle position and magnification. For example, rotatable turrets (or knobs) may be provided to adjust the position of a reticle and a rotatable dial (or ring) may be provided to focus or adjust the magnification of the scope. These knobs and rings may be rotatable by hand making adjustments in the field simple and quick.

In order to facilitate manual manipulation, the outer surfaces of these knobs and rings may have textured surfaces or small protrusions. The purpose of the textured surfaces or protrusions is to help a user to engage the knobs or rings with the user's hands and fingers. For example, protrusions can provide leverage for a user to rotate a knob or ring with a finger. Even with small protrusions, it is often difficult for a user to rotate a knob or ring due to the small size of the protrusions and interference with other components on the gun scope. These problems are often exaggerated in use because it is usually a gloved finger that is being used to engage the protrusions.

Over time, gun scopes have evolved to include advanced features including electronics, such as a processor and memory, which may perform calculations to assist a user in determining the appropriate corrections to make for a given shot. For example, a gun scope may have a memory that contains a ballistics table with different data based on different types of ammunition that may be used with a gun. A processor may use this information, along with distance, angle, wind, humidity, or other factors to compute an appropriate correction that a user may implement by manually adjusting one or more turrets or rings on the scope.

These electronic components require a power source, such as a battery, in order to operate. It is often difficult to find a suitable place to house within the scope the one or more batteries because gun scopes often have narrow and sleek profiles. In order to limit the negative spatial impact on the gun scope, smaller batteries are often used. Unfortunately, with smaller batteries comes a more limited operational time. This can be problematic, as users often take these gun scopes into the field for multiple days without access to either an outlet to charge the battery or a store to purchase a replacement.

The present invention addresses deficiencies in current gun scopes and provides various advantages as will become apparent upon reading of the present disclosure.

BRIEF SUMMARY OF THE INVENTION

In accordance with the present invention, embodiments of a gun scope are disclosed. In accordance with one embodiment, a gun scope comprises a body member, a rotatable component that is configured to rotate about an axis relative to the body member, and a battery compartment configured to house at least one battery therein, wherein the battery component is associated with and rotates with the rotatable component about the axis.

In one embodiment, the battery compartment radially protrudes from the rotatable component relative to the axis.

In one embodiment, the battery compartment is configured as a lever for rotation of the rotatable component about the axis.

In one embodiment, the gun scope further comprises an electronic component contained within the body member.

In one embodiment, the battery compartment is in electrical communication with the electronic component.

In one embodiment, the gun scope further comprises a first electrical contact member in electrical communication with a first terminal of the at least one battery and a second electrical contact member in electrical communication with a second terminal of the at least one battery, wherein the first electrical contact and the second electrical contact are configured for rotation about the axis with rotatable member.

In one embodiment, the gun scope further comprises a first electrical trace and a second electrical trace, wherein when the rotatable member rotates from a first position to a second position, the first electrical contact maintains physical and electrical contact with the first trace and the second electrical contact maintains physical and electrical contact with the second trace.

In one embodiment, the first trace and the second trace are formed on a printed circuit board.

In one embodiment, the rotatable member is configured for rotation of less than 360° about the axis.

In one embodiment, the rotatable member is configured for rotation of about 270° about the axis.

In one embodiment, the gun scope further comprises the rotatable component is a magnification ring.

In one embodiment, the electronic component includes a processor.

In one embodiment, the electronic component includes a display device.

In one embodiment, the electronic component includes at least one sensor.

In one embodiment, the electronic component includes a memory device.

In one embodiment, the gun scope further comprises at least one rotatable knob configured to adjust a position of a reticle.

In one embodiment, the battery compartment is sized and shaped and configured to house one or more AA-type, AAA-type, AAAA-type, C-type, D-type, 9 volt-type, CR2, CR123, or CR2032 batteries.

In one embodiment, further comprising a rechargeable battery disposed in the battery compartment.

In one embodiment, the battery compartment extends a distance radial outward from the rotatable component relative to the axis a distance of approximately 11 millimeters (mm) or greater.

In one embodiment, the battery compartment extends a length of at least approximately 45 mm in a direction substantially parallel to the axis.

In one embodiment, the battery compartment is integrally formed with the rotatable component.

Features and components of one embodiment may be combined with features or components or another embodiment without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
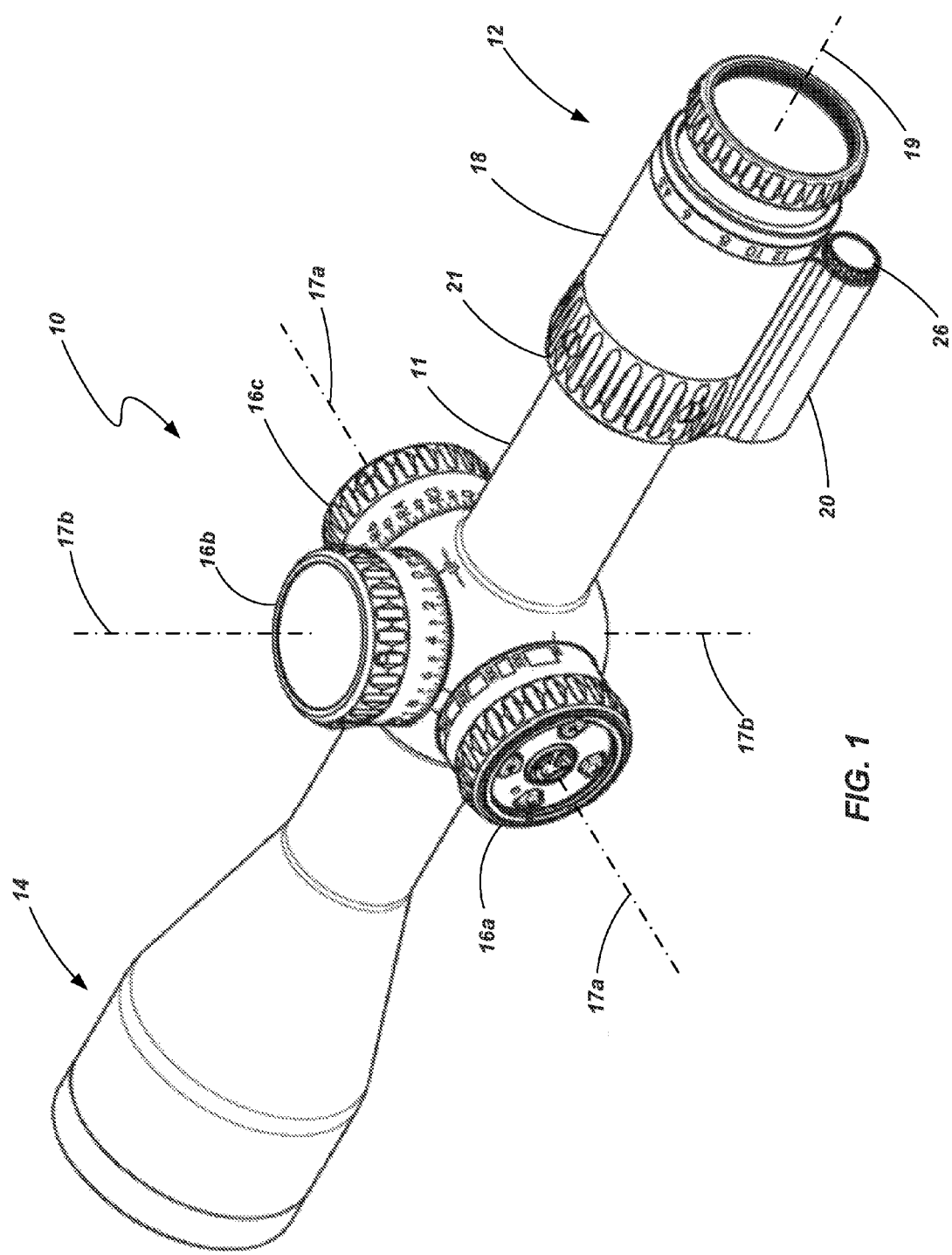
FIG. 1 is a perspective view of a gun scope according to an embodiment of the present invention.

FIGS. 1-4 illustrate an a gun scope 10 according to one example embodiment of the present disclosure. The gun scope 10 includes a body portion 11, a proximal end 12 and a distal end 14. The gun scope 10 may be attached to a firearm, such as a rifle as will be appreciated by those of ordinary skill in the art. The gun scope 10 may include one or more rotatable components, such as knobs 16a, 16b, and 16c and one or more rings 18. The knobs 16a, 16b, and 16c and ring 18 may rotate relative to body portion 11 about various axes. For example, knobs 16a and 16c may rotate about a first axis 17a, while knob 16b may rotates about a second axis 17b, and while ring 18 may rotate about a third axis 19. A user may rotate knobs 16a, 16b, and 16c and/or ring 18 in order to selectively adjust one or more adjustable parameters on gun scope 10. For example, rotation of knobs 16a, 16b, and 16c about their respective axes may adjust the position of a reticle 15 (see FIG. 4) within the scope 10. The ring 18 may be configured as a magnification dial (sometimes also called a power ring) which, when selectively rotated by a user, adjusts the magnification of a viewing area of gun scope 10.

The ring 18 may be positioned at the proximal end 12 of gun scope 10 and may have a battery compartment 20 secured to an exterior surface of the ring 18. The battery compartment 20 is configured to rotate with the ring 18 about its axis 19 relative to body portion 11. The battery compartment 20 may be secured to an exterior surface of the ring 18 in a number of ways. For example, the battery compartment 20 may be integrally formed with the ring 18 or it may be a separate component that is attached to the ring 18. The battery compartment 20 may include a cap 26, which may be selectively removed by a user to access the battery inside.

Figure 2:
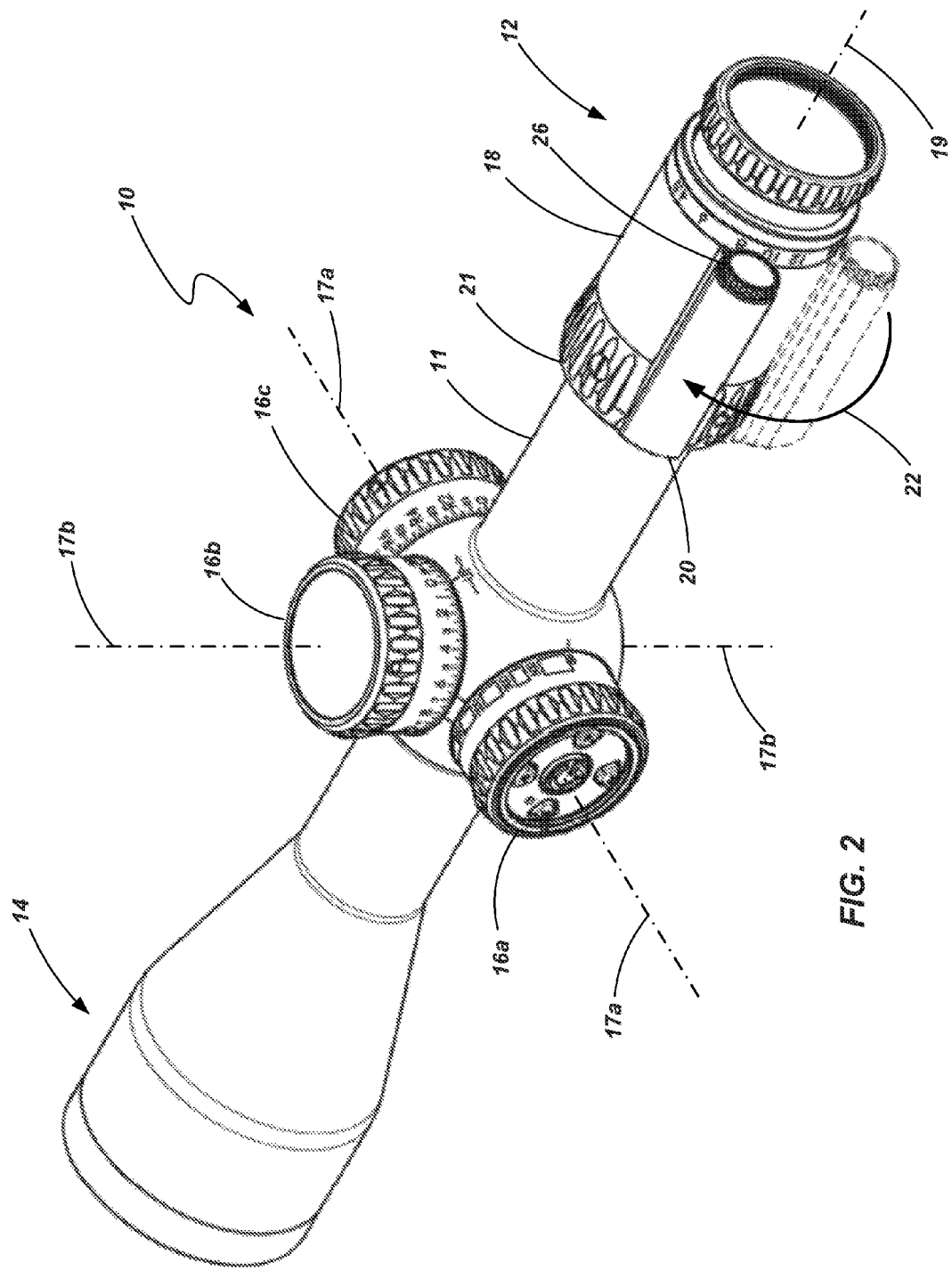
FIG. 2 is a perspective view of a gun scope shown in FIG. 1, with a component adjusted to a different position or state.
Figure 3:
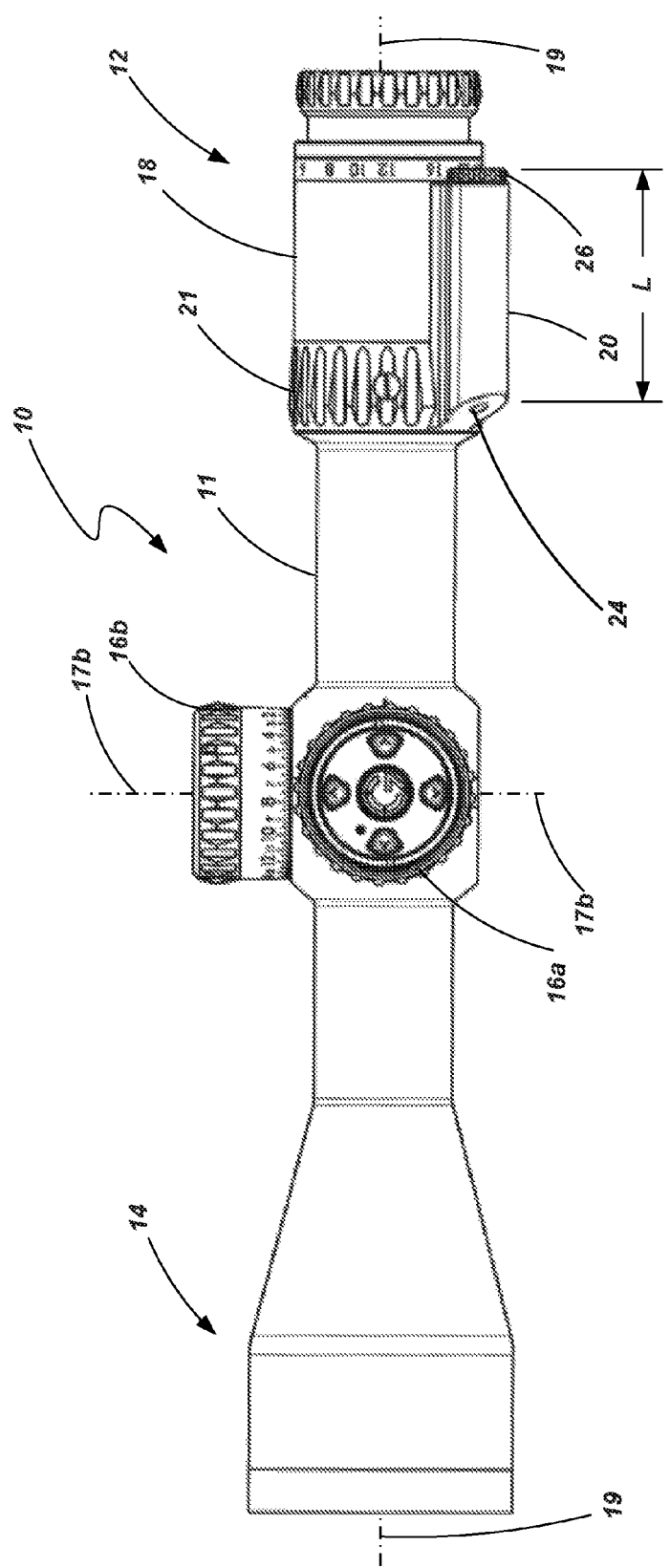
FIG. 3 is a side view of the gun scope shown in FIG. 1.
Figure 4:
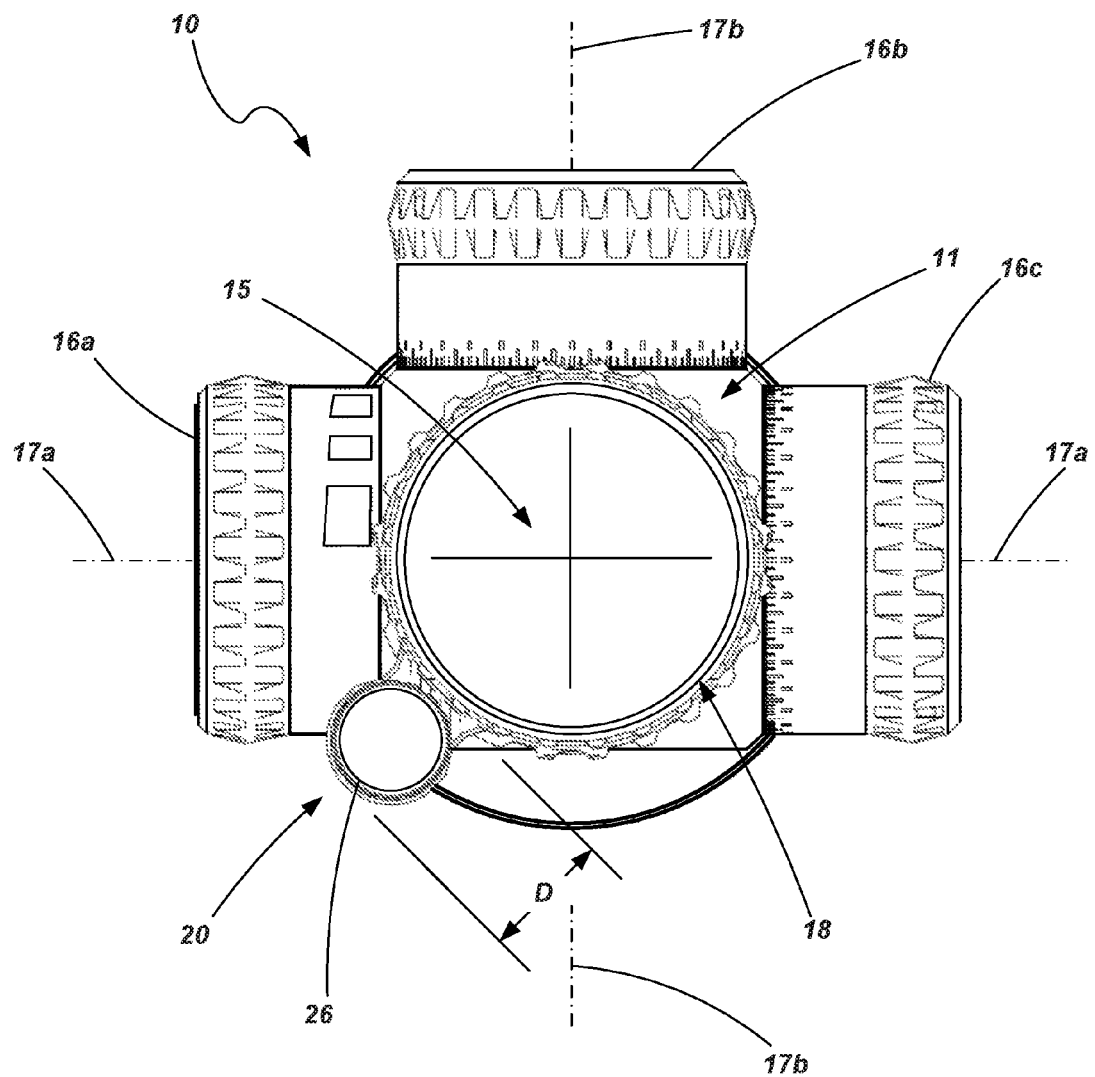
FIG. 4 is an end view of the proximal end of gun scope shown in FIG. 1.

Considering FIG. 2 in comparison with FIG. 1, movement of the ring 18 about its axis 19 relative to body portion 11 of the gun scope 10 includes commensurate movement of the battery compartment 20. As can be seen in FIG. 2, the ring 18 and the battery compartment 20 may be rotated in the direction of arrow 22, or in a direction opposite to the direction of arrow 22, to adjust the magnification level of gun scope 10 or to adjust another selectively adjustable parameter.

With reference again to FIG. 1, the battery compartment 20 provides a radially extending protrusion on the ring 18 that may be used for leverage by a user to rotate ring 18. This added leverage provides an advantage for any user, including, for example, added usefulness for a user that may be attempting to rotate the ring 18 while wearing gloves. In addition to battery compartment 20, the exterior surface of ring 18 may further include additional texture 21 to further facilitate a user's ability to grasp and turn ring 18. Additionally, in some embodiments a texture feature may be formed on the exterior surface of the battery compartment itself.

In addition to providing a user with additional leverage for rotating ring 18, battery compartment 20 may be sized and shaped to house one or more batteries that are configured to provide power to electronic components of gun scope 10. For example, battery compartment 20 may be sized and shaped to house one or more small cylindrical-shaped batteries, such as an AA-type, an AAA-type or an AAAA-type battery. Considering an embodiment using an AAA-type battery, the protrusion may exhibit a dimension "L" (see FIG. 3) that is longer than approximately 45 millimeters (mm) in a direction that is substantially parallel with the axis 19 about which the ring 18 rotates, and extends radially outward (relative to axis 19) from the ring 18 a distance "D" (see FIG. 4) of more than approximately 11 mm beyond the radius of the ring 18. Of course, other embodiments may result in other sizes of the battery compartment 20 depending at least in part, for example, on the size of the battery being utilized.

In other embodiments, a battery compartment that is sized and shaped to house a different shape or size of battery may be provided. For example, a battery compartment may be sized and shaped to house C-type, D-type, 9 volt-type, CR2, CR123, CR2032, A23 or other types of batteries. In some embodiments, the battery compartment may be sized for one particular size of battery (e.g., a AA-type) but configured to receive adapters enabling it to use other types of batteries (e.g., AAA-type or AAAA-type). In other embodiments, the battery may be a proprietary battery rather than one that is commercially available. In some embodiments, the battery housed within the battery compartment 20 may be a rechargeable type battery—either proprietary or commercially available. To enable recharging, battery compartment 20 may include a charging port 24 (see FIG. 3) that a user may connect to an external power source, such as an outlet or a battery pack, using a power cord. In other embodiments, a rechargeable battery may be charged using wireless charging techniques.

In order to maintain electrical contact between the electrical components within gun scope 10, spring-loaded contacts may be positioned within battery compartment 20 and underneath ring 18 to make contact with a printed circuit board, such as a flex printed circuit board, within body portion 11 of gun scope 10. Once a load is placed on the spring(s), the contacts may maintain electrical communication with the printed circuit board or other electronic components within body portion 11 through friction and pressure applied by the spring(s).

Figure 5:
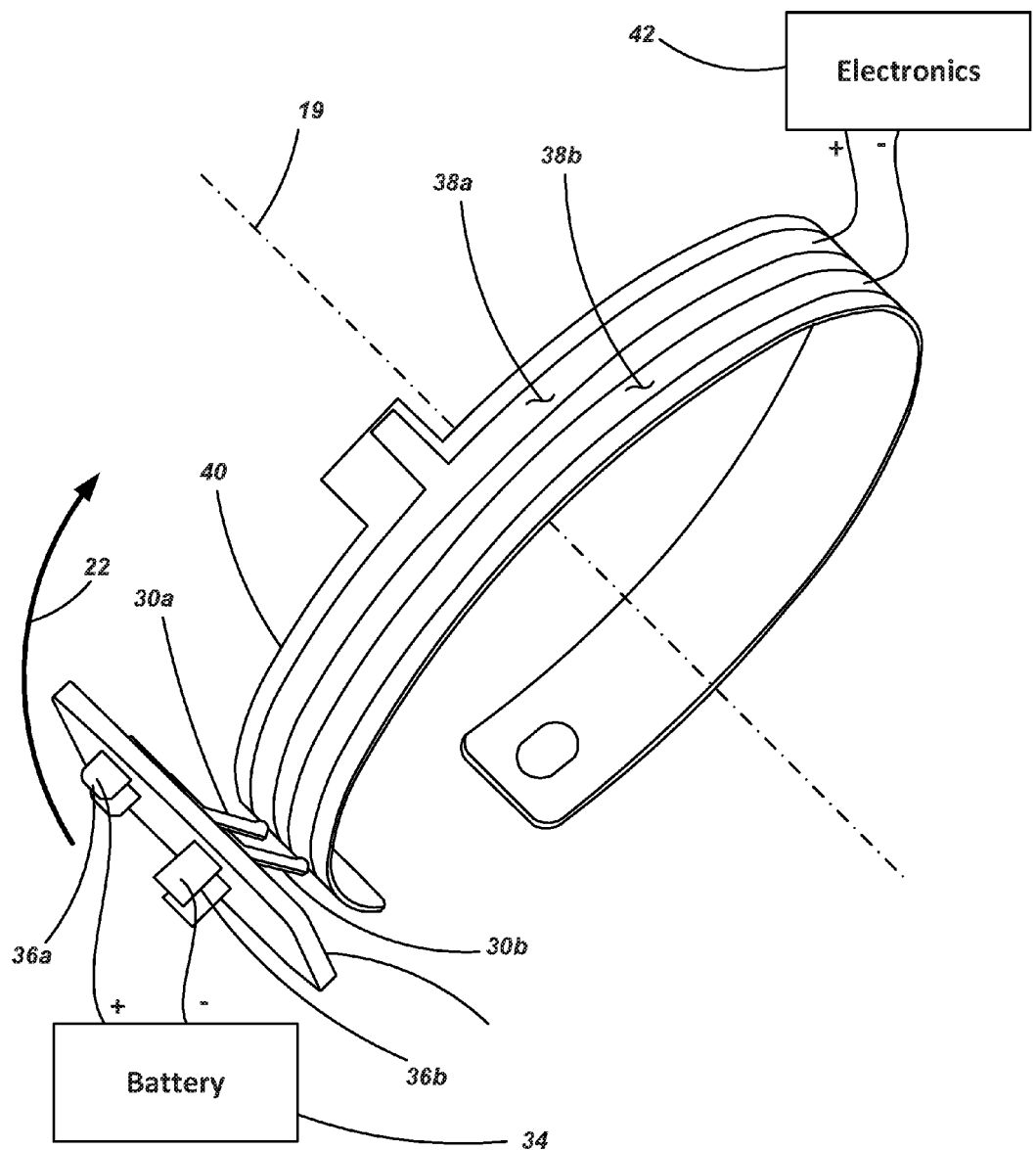
FIG. 5 is perspective view showing certain components of a gun scope according to an embodiment of the present disclosure.

For example, referring to FIG. 5, a first electrical contact 30a and a second electrical contact 30b may be coupled with a bracket or plate member 32, the plate member being associated with the battery compartment 20, the ring 18 or both. One terminal of the battery 34 (e.g., the "+" terminal) may be in electrical communication with a lead 36a of the first electrical contact 30a, and another terminal of the battery 34 (e.g., the "−" terminal) may be in electrical communication with a lead 36b of the second electrical contact 30b.

The contacts 30a and 30b may be configured as cantilevered contacts, such as shown, or may be configured to otherwise be biased into physical and electrical contact with associated conductive traces 38a and 38b which may be formed on, for example, a printed circuit board 40. In the embodiment shown in FIG. 5, the printed circuit board 40 may be formed as a generally cylindrical or ring like member configured for positioning within the ring 18 of the gun scope 10. As the ring 18 and the battery compartment 20 rotate about axis 19 relative to the body portion 11 of the gun scope 10 (such as discussed above), the contacts 30a and 30b and their associated components (e.g., plate member 32 and leads 36a and 36b) as again indicated by arrow 22 in FIG. 5. During rotation, the contacts 30a and 30b maintain physical and electrical contact with their associated conductive traces 38a and 38b, respectively, providing electrical power through the traces 38a and 38b to associated electronics 42. The electronics 42 may include any of a variety of components including, for example, a processor, memory, a display, sensors (e.g., inclination, azimuth, temperature, pressure), GPS devices, range finder components or other devices. Non-limiting examples of some electronics that may be incorporated into or otherwise associated with the gun scope are described in U.S. Patent Publication No. US20150247702, published Sep. 3, 2015, the disclosure of which is incorporated by reference herein in its entirety.

In various embodiments, the ring 18 and battery compartment 20 (and, thus, an battery 34 contained therein) may rotate through different angular ranges relative to the body portion 11 of the gun scope 10. In one embodiment, the ring 18 and battery compartment 20 may not be able to rotate a full 360 degrees, but may be limited to something less than 360 degrees. In some embodiments, a ring and battery compartment may be able to rotate 359 degrees or much less, such as 270 degrees. In other embodiments, the ring 18 and battery compartment 20 may be sized and positioned so that full 360 degree rotation (or more) is possible.

While the illustrated embodiment of the present disclosure shows a battery compartment 20 associated with ring 18 at the proximal end 12 of gun scope 10, other embodiments are also possible. For example, a battery compartment may be associated with one or more of the knobs 16a, 16b, or 16c used to adjust the reticle 15. In addition, a battery compartment may be associated with a selectively adjustable ring at the distal end 14 of gun scope 10.

Additionally, while the illustrated embodiment of the present disclosure depicts a battery compartment that protrudes from a rotatable element, it is noted that a battery compartment may be formed within the rotatable element (e.g., the magnifying ring 18) in a manner such that it doesn't protrude or alter the shape of the ring in a noticeable manner. Rather, the battery compartment may be formed such that it (and the battery contained therein) rotate with the rotatable element without providing a leverage point to assist the user in rotating the rotatable element.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

What is claimed is:

1. A gun scope comprising:
   a body member;
   a magnification ring that is configured to rotate about an axis relative to the body member; and
   a battery compartment configured to house at least one battery therein, wherein the battery component is associated with and rotates with the magnification ring about the axis.

2. The gun scope of claim 1, wherein the battery compartment radially protrudes from the magnification ring relative to the axis.

3. The gun scope of claim 2, wherein battery compartment is configured as a lever for rotation of the magnification ring about the axis.

4. The gun scope of claim 3, further comprising an electronic component contained within the body member.

5. The gun scope of claim 4, wherein the battery compartment is in electrical communication with the electronic component.

6. The gun scope of claim 5, further comprising a first electrical contact member in electrical communication with a first terminal of the at least one battery and a second electrical contact member in electrical communication with a second terminal of the at least one battery, wherein the first electrical contact and the second electrical contact are configured for rotation about the axis with magnification ring.

7. The gun scope of claim 6, further comprising a first electrical trace and a second electrical trace, wherein when the magnification ring rotates from a first position to a second position, the first electrical contact maintains physical and electrical contact with the first trace and the second electrical contact maintains physical and electrical contact with the second trace.

8. The gun scope of claim 7, wherein the first trace and the second trace are formed on a printed circuit board.

9. The gun scope of claim 7, wherein the magnification ring is configured for rotation of less than 360° about the axis.

10. The gun scope of claim 9, wherein the magnification ring is configured for rotation of about 270° about the axis.

11. The gun scope of claim 10, wherein the electronic component includes a processor.

12. The gun scope of claim 10, wherein the electronic component includes a display device.

13. The gun scope of claim 10, wherein the electronic component includes at least one sensor.

14. The gun scope of claim 10, wherein the electronic component includes a memory device.

15. The gun scope of claim 1, further comprising at least one rotatable knob configured to adjust a position of a reticle.

16. The gun scope recited in claim 1, wherein the battery compartment is sized and shaped and configured to house one or more AA-type, AAA-type, AAAA-type, C-type, D-type, 9 volt-type, CR2, CR123, or CR2032 batteries.

17. The gun scope of claim 1, further comprising a rechargeable battery disposed in the battery compartment.

18. The gun scope of claim 1, wherein the battery compartment extends a distance radial outward from the magnification ring relative to the axis a distance of approximately 11 millimeters (mm) or greater.

19. The gun scope of claim 1, wherein the battery compartment extends a length of at least approximately 45 mm in a direction substantially parallel to the axis.

20. The gun scope of claim 1, wherein the battery compartment is integrally formed with the magnification ring.

21. The gun scope of claim 1, wherein the magnification ring is configured for rotation of at least 360° about the axis.

\* \* \* \* \*